Herman H. Mueller
INVENTOR.

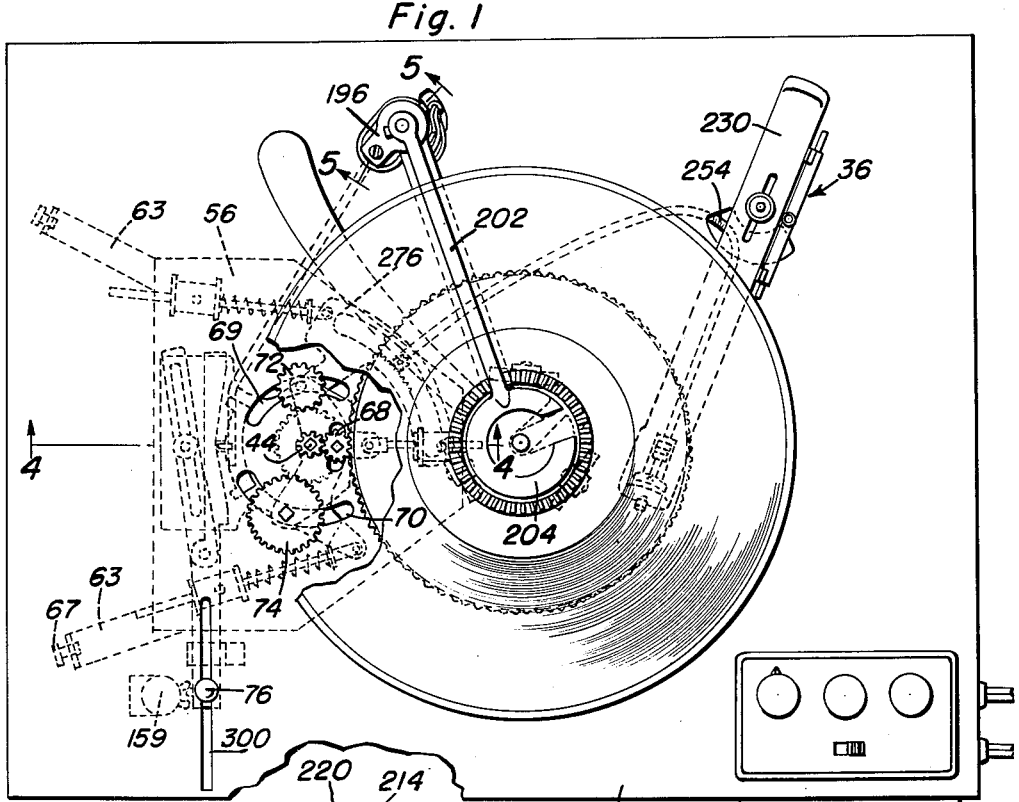
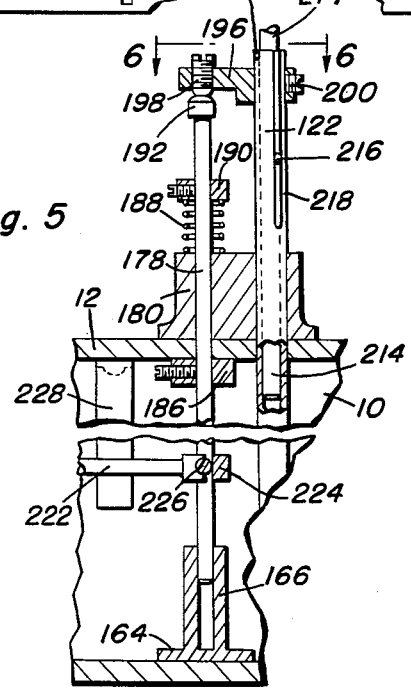
Aug. 22, 1961   H. H. MUELLER   2,997,303
AUTOMATIC TURNTABLE SPEED AND NEEDLE CHANGER CONTROL
FOR PLAYING INTERMIXED RECORDS
Filed April 8, 1953   6 Sheets-Sheet 1
Fig. 1
Fig. 5
Fig. 6
Herman H. Mueller
INVENTOR.

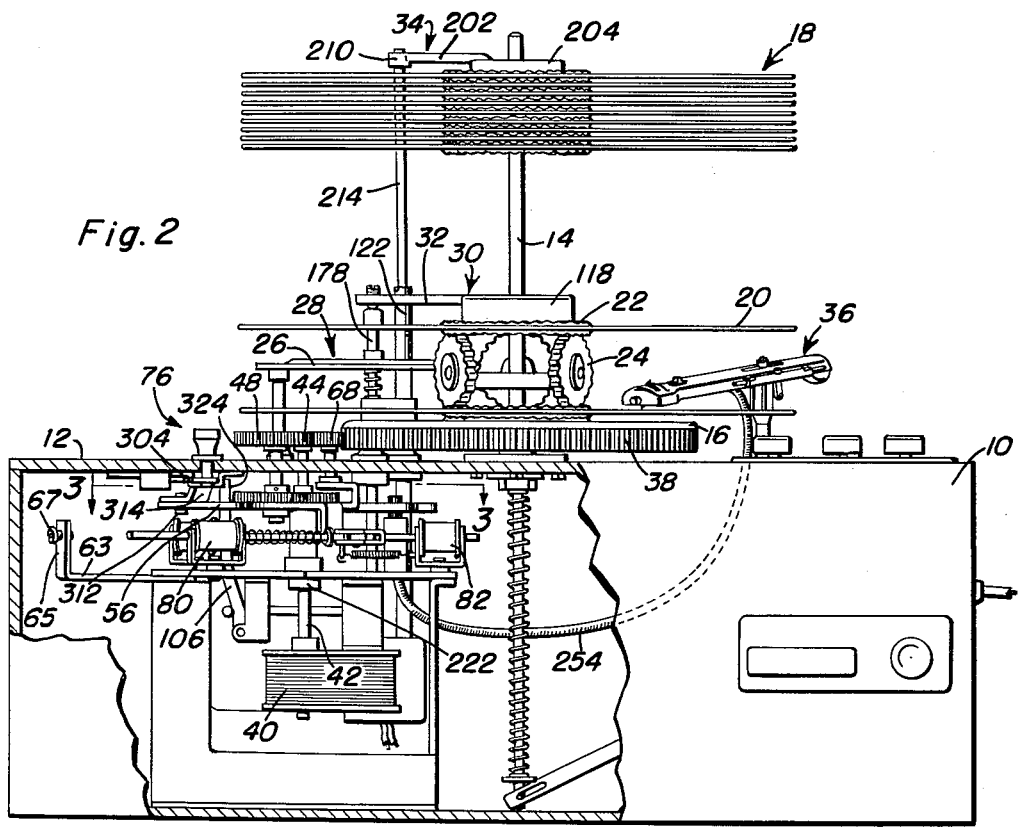
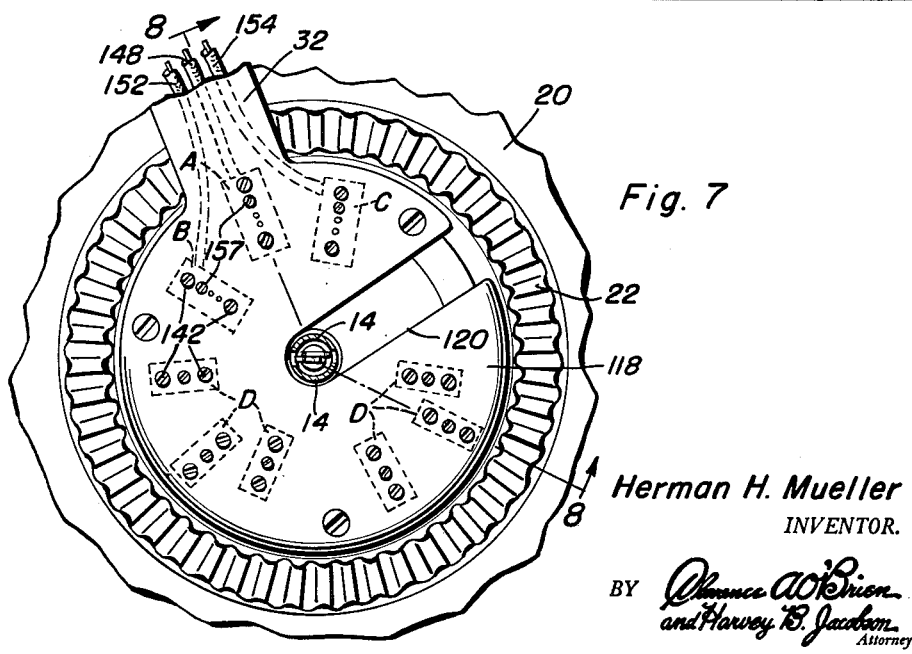

BY Clarence A. O'Brien
and Harvey B. Jacobson
Attorneys

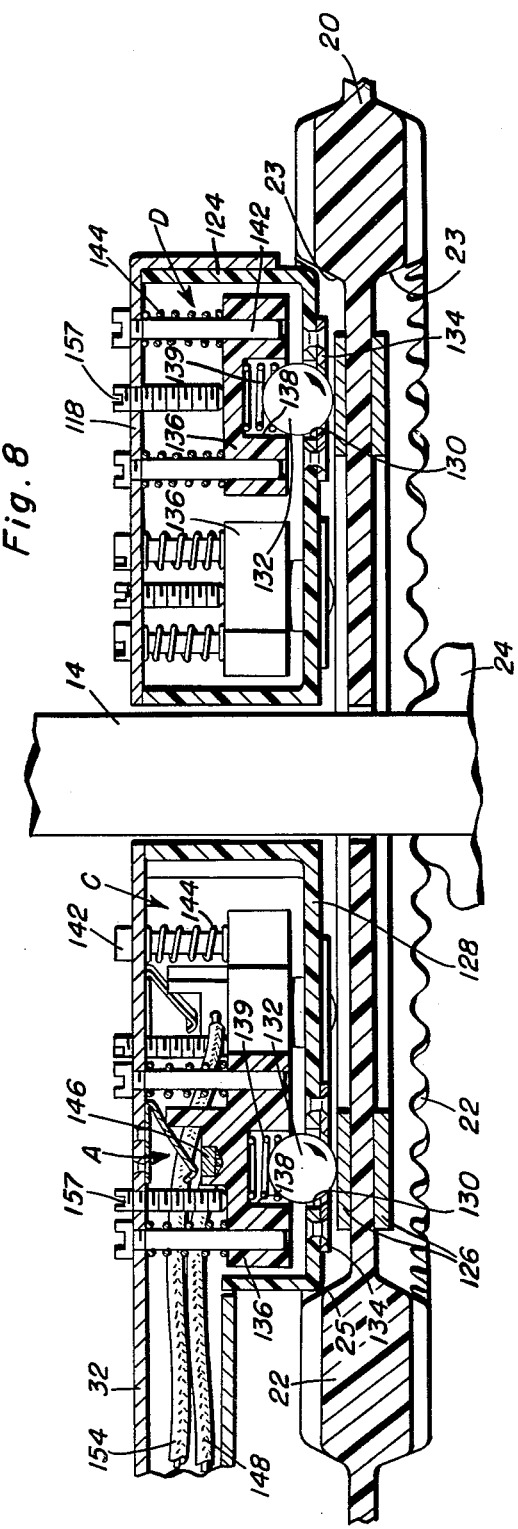

Aug. 22, 1961 H. H. MUELLER 2,997,303
AUTOMATIC TURNTABLE SPEED AND NEEDLE CHANGER CONTROL
FOR PLAYING INTERMIXED RECORDS
Filed April 8, 1953 6 Sheets-Sheet 5
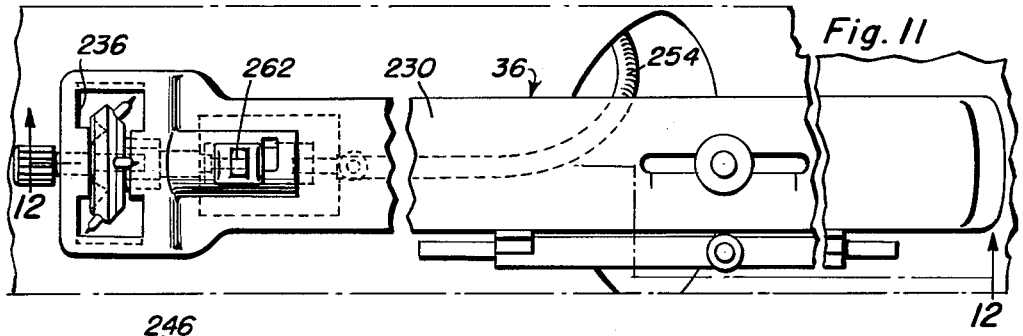
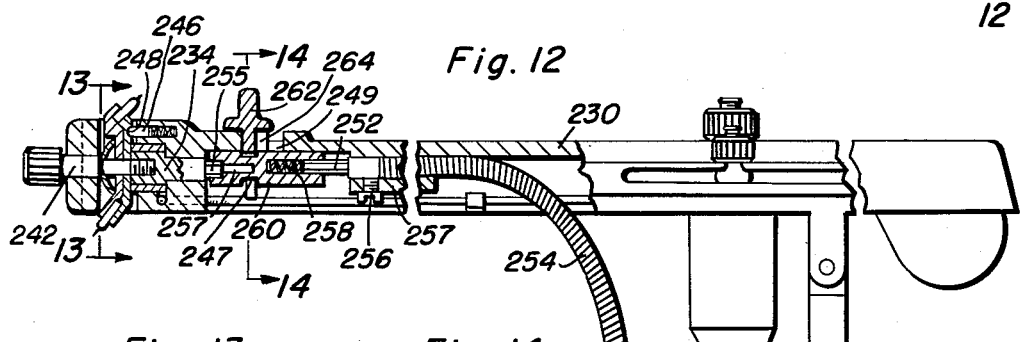
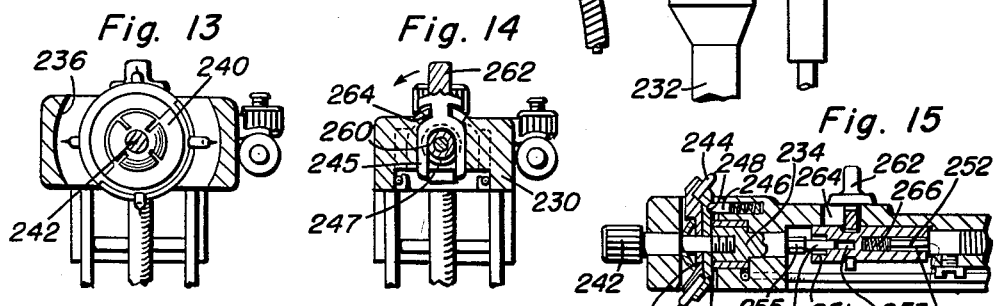
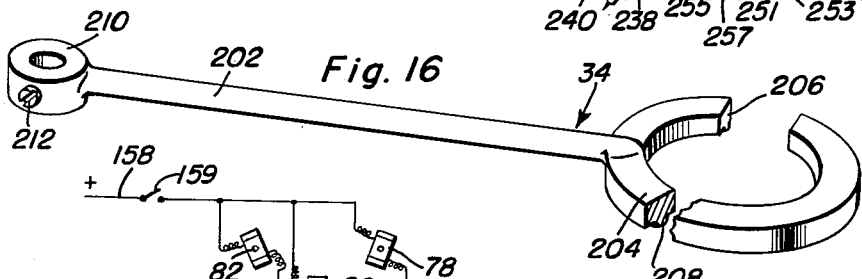
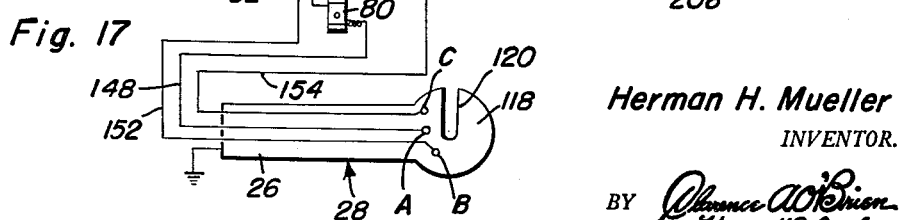
Herman H. Mueller
INVENTOR.

Herman H. Mueller
INVENTOR.

ional important object of the invention is to
United States Patent Office 2,997,303
Patented Aug. 22, 1961

2,997,303
AUTOMATIC TURNTABLE SPEED AND NEEDLE CHANGER CONTROL FOR PLAYING INTERMIXED RECORDS
Herman H. Mueller, 104 Park Ave., Ephrata, Pa.; Elizabeth M. Mentzer, executrix of said Herman H. Mueller, deceased, assignor of small interests to various assignees
Filed Apr. 8, 1953, Ser. No. 347,507
20 Claims. (Cl. 274—10)

This invention comprises novel and useful improvements in an automatic turntable speed and needle changer control for playing a stack of intermixed records, and more specifically relates to an automatic record player having provision therein for playing at the proper speed and in a completely automatic manner, or in a manually controlled manner if preferred, an intermixed stack of records of either the 78, 45 or 33⅓ r.p.m. or other types; and for automatically, or by manual operation if preferred, changing the needles in the tone arm in accordance with the type of sound groove of the record to be played by the apparatus.

The primary object of this invention is to provide a record player mechanism capable of playing in a fully automatic manner, stacks of intermixed records of different sizes, different speeds of rotation and of different types of sound grooves.

A further important object of the invention is to provide a record player mechanism in accordance with the preceding object wherein the tone arm needles or styluses are automatically changed in accordance with the type of record to be played.

A further important object of the invention is to provide a record player mechanism of the character hereinbefore set forth wherein the automatic operations of changing the turntable speed and selection of the tone arm styluses are carried out by electrical means.

Still another important object of the invention is to provide a record player mechanism as set forth hereinbefore which shall be especially adapted for incorporation, in a compact and improved manner, in the Dual Record Player of my co-pending applications Serial Nos. 98,048 now Pat. No. 2,729,455; 296,558 now Pat. No. 2,809,841; 296,382 now Pat. No. 2,809,843; 318,365 now Pat. No. 2,809,840; and 314,987 now Pat. No. 2,837,337.

A further and more specific object of the invention is to provide a record player mechanism wherein the turntable driving mechanism may be positively maintained in a selected speed in accordance with different types of records to be played, in an advantageous and highly improved manner and by a novel adjustment maintaining means therefor.

A further object of the invention is to provide a record player mechanism wherein a change speed drive is provided for a turntable together with means for automatically adjusting the change speed drive in conformity with records of different speeds to be played by the device.

Yet another object of the invention is to provide a record playing mechanism wherein the speed of the turntable is controlled by a control means mounted upon a given record.

Another object is to provide a record playing mechanism wherein the speed of the turntable, the type of needle, or both are controlled automatically by the record to be played.

An additional important object of the invention is to provide an improved phonograph record of a novel construction whereby the record may actuate an automatic control means for causing rotation of the turntable at the proper speed for that record.

A still further object of the invention is to provide a mechanism in conformity with the immediately preceding object wherein there is provided interconnecting means whereby a stylus of the tone arm may be brought into operative position for playing a given record in accordance with the type of the sound groove thereof.

Another subordinate object is to provide a mechanism in accordance with the immediately preceding object having a manual control for disengaging the interconnecting means to enable manual adjustment of the stylus.

An important further object is to provide a mechanism, connected to and operated by a turntable speed adjusting means, for automatically changing the tone arm pick-up needle in conformity with and by a change in the speed of the turntable.

A further and more specific object of the invention is to provide a record player having an automatic speed changer mechanism for driving the turntable which shall be controlled by an electrical circuit, the latter in turn being controlled by a switch operated by and in timed relation to actuation of the record changer mechanism.

Still another object of the invention is to provide a record player having an improved detachable association of a stack weight arm with a pressure arm of the apparatus.

Yet another specific object of the invention is to provide an improved record player mechanism having a change speed mechanism for driving a turntable, an actuating means for the change speed mechanism including an electrical circuit, a first set of switches carried by a pressure arm of the apparatus and adapted for selective actuation by a speed control track upon a record, together with main control switches for the electrical circuit which will permit energization of that circuit during a predetermined portion of the record changing cycle of the apparatus.

Another object is to provide a mechanism in conformity with the immediately preceding object having a manual device for controlling the turntable change speed mechanism and wherein provision is made for rendering the electric circuit inoperative upon actuation of the manual device.

A still further object of the invention is to provide a phonograph record player having a turntable change speed mechanism and a tone arm needle changer, interconnecting means for operatively connecting the needle changer with the change speed mechanism and electrical means for controlling automatically the change speed mechanism.

Yet another object is to provide a phonograph record player having a turntable change speed mechanism, a tone arm needle changer and interconnecting means for the mechanism and changer together with a manual control for the change speed mechanism.

An additional object of this invention is to provide a phonograph record player wherein a pressure arm is provided for applying pressure to a record for holding the latter in non-slipping interlocking engagement with a record driving and supporting means, another record or with a turntable and which will have a guiding and centering engagement with a record.

Another object is to provide an electrical control means for adjusting the turntable speed and/or the tone arm needle assembly which shall include a switch with a movable element whose initial movement will energize a control circuit and whose further movement will break said control circuit.

Still another object is to provide in a pressure head for phonograph record players a single unit which will function to apply pressure to a record disk, to energize a control circuit and to subsequently deenergize said control circuit.

These together with other objects and advantages which will become subsequently apparent reside in the details of construction and operation as more fully hereinafter described and claimed, reference being had to the accompanying drawings forming part hereof, wherein like numerals refer to like parts throughout, and in which:

FIGURE 1 is a top plan view of a suitable form of a phonograph record player incorporating therein the principles of this invention, certain concealed parts being shown in dotted lines, and parts being broken away to show portions of the driving assembly of the turntable speed changing mechanism;

FIGURE 2 is an elevational view of the apparatus of FIGURE 1, parts being broken away to show a portion of the internal mechanism of the same;

FIGURE 5 is an enlarged fragmentary detail view taken substantially upon the plane indicated by the vertical sectional line 5—5 of FIGURE 1, and illustrating an actuator for the latch release mechanism of the variable speed drive;

FIGURE 6 is a horizontal sectional detail view taken substantially upon the plane indicated by the section line 6—6 of FIGURE 5;

FIGURE 7 is a fragmentary horizontal top view of a portion of the pressure arm of the phonograph record player showing the arrangement of certain micro-switches thereon;

FIGURE 8 is a vertical sectional view upon an enlarged scale taken substantially upon the plane indicated by the broken section line 8—8 of FIGURE 7 and showing structural details of the switch units and pressure units, and showing the pressure head in its lowered, pressure applying position during the playing of a record;

FIGURE 9 is a fragmentary view of a portion of FIGURE 8 and showing the position of the switch unit during the first phase of its operation, when the pressure head is in the first portion of its set down operation, with the pressure head just engaging the record disk and with the switch unit in position for its initial actuating movement;

FIGURE 10 is a view similar to FIGURE 9 but showing the position of the pressure head and switch unit parts at a later stage in the pressure head set-down, with the switch unit actuated to circuit closing position;

FIGURE 11 is a top plan view, parts being broken away, of a tone arm incorporating therein a needle changing assembly;

FIGURE 12 is a vertical sectional view taken substantially upon the plane indicated by the section line 12—12 of FIGURE 11 and showing other details of the needle changing assembly;

FIGURE 13 and FIGURE 14 are vertical transverse sectional views taken respectively substantially upon the planes indicated by the section lines 13—13 and 14—14 of FIGURE 12;

FIGURE 15 is a view similar to a portion of FIGURE 12 and illustrating the needle changer mechanism with the automatic control of the same being manually disengaged;

FIGURE 16 is a perspective view, parts being broken away, of a gravity weight adapted to engage the topmost record of a stack of records supported above the record playing elements of the apparatus for holding the records of the stack in horizontal planes;

Figure 18:
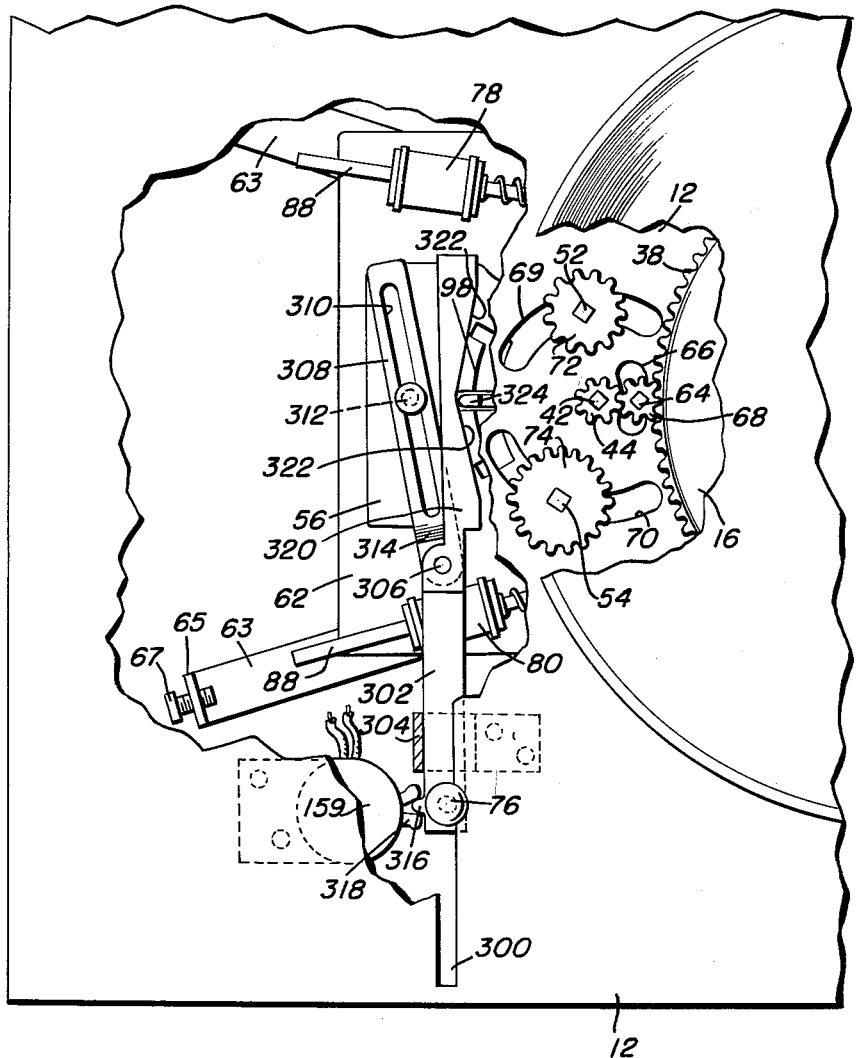

FIGURE 17 is a diagrammatic view of an electrical circuit for automatically controlling the speed of the turntable in accordance with the speed of the record to be played; and, FIGURE 18 is a top plan view of a portion of the record player, parts being broken away, showing a portion of the manual control for actuating the change speed gearing of the turntable and for rendering inoperative the automatic mechanism controlling the turntable change speed mechanism.

The two principal components of this invention reside first, in the provision of means whereby a phonograph record player is caused to automatically adjust the speed of rotation of the turntable in accordance with the speed at which a given record is to be played; and second, in the provision of means whereby the stylus in the pickup unit of a tone arm is changed in synchronization with the changing of the speed of rotation of the turntable whereby the proper stylus is selected and positioned for playing a given record. These components each include several novel sub-assemblies or features which are capable of independent and separate utility from the rest of the organization as set forth. These features of the invention may be utilized in phonograph record players of various conventional types, but are specially useful and have been illustrated as being incorporated in the Dual Phonograph Record Player, disclosed and claimed in my applications Serial Nos. 98,048 now Pat. No. 2,729,455 and 314,987 now Pat. No. 2,837,337, wherein the lower and upper sides of a record are selectively played automatically or manually in succession while maintaining the record in a substantially horizontal plane; and especially in the playing of records of the interlocking, non-slipping type whereby perfect fidelity of tonal reproduction of a record is obtained.

The phonograph record player illustrated in the accompanying drawings is in general of the type disclosed in my above mentioned applications, consisting of a cabinet or casing 10 in which is housed the operating machanism of the player, this cabinet including a top wall 12 upon which is mounted a spindle 14 and a turntable 16. A stack of records indicated generally by the numeral 18 is positioned at the upper end of the spindle 14 and is supported and retained thereon by any suitable form of record supporting and releasing means, such as those set forth in detail in my co-pending applications Serial Nos. 98,048, now Pat. No. 2,729,455, and 318,365, now Pat. No. 2,809,840 the actual contruction and operation of the stack supporting and releasing means forming no part of the invention as set forth and claimed hereinafter, and if desired, being of the type described and claimed in my co-pending application Serial No. 318,365, now Pat. No. 2,809,840.

Each of the records 20 which is illustrated in the drawings is conveniently of the interlocking non-slipping type disclosed in my co-pending applications Serial Nos. 98,048, now Pat. No. 2,729,455; 296,382, now Pat. 2,809,843; 318,365, now Pat. No. 2,809,840; and 324,993, now Pat. No. 2,776,838; and has upon its opposite sides and within the sound track of the record annular toothed interlocking rings 22 whereby adjacent records may be interlocked with each other in a positive non-slipping manner and whereby the sound tracks of the records may likewise be spaced from each other when so interlocked. By this construction a record may be either interlockingly engaged with a corresponding annular, toothed, interlocking surface of the turntable, with records which are interlocked with and supported by the turntable or with toothed rollers 24 carried by a supporting arm 26 and forming part of a record supporting and driving means indicated generally by the numeral 28, as more fully disclosed and claimed in my above identified co-pending applications.

Likewise illustrated in the drawings is a pressure arm or pressure plate assembly indicated generally by the numeral 30, which includes a pressure arm 32 which is adapted to press downwardly upon a record 20 to firmly position the latter upon the supporting and driving rollers 24, or alternatively to firmly press downwardly upon a record when the latter is disposed upon the turntable 16, to thereby enhance the effectiveness of the non-slipping interlocking connection of the record with the turntable.

Indicated generally by the numeral 34 is a stack weight assembly whereby pressure is applied to the stack of records 18 to hold the same in non-slipping engagement with each other, to hold the records in horizontal planes, and to cause the records to feed downwardly from the stack during the operation of the record changing mechanism of the record player.

There is further disclosed in the drawings a tone arm assembly indicated generally by the numeral 36, and which, if desired, may be of the construction disclosed and claimed in my co-pending application Serial No. 296,558, now Pat. No. 2,809,841.

I

Variable speed drive and control

The variable speed drive of the turntable and the automatic control means therefor will now be described, reference being made particularly to FIGURES 1–10 and 18. An annular or ring gear 38 encircles the periphery of the turntable 16 for driving the latter. A change speed gearing is provided for selectively driving the turntable at speeds of 78, 45, 33⅓ r.p.m. or other speeds in order to play records having these speeds of rotation. A source of power such as a constant speed electric motor 40 is suitably housed and mounted within the casing 10 to provide power for rotating the turntable, and for driving the synchronizing and other elements of the record player. This motor has a drive shaft 42 which extends upwardly through the top wall 12 of the cabinet 10 as also seen in FIGURE 18.

Figure 3:
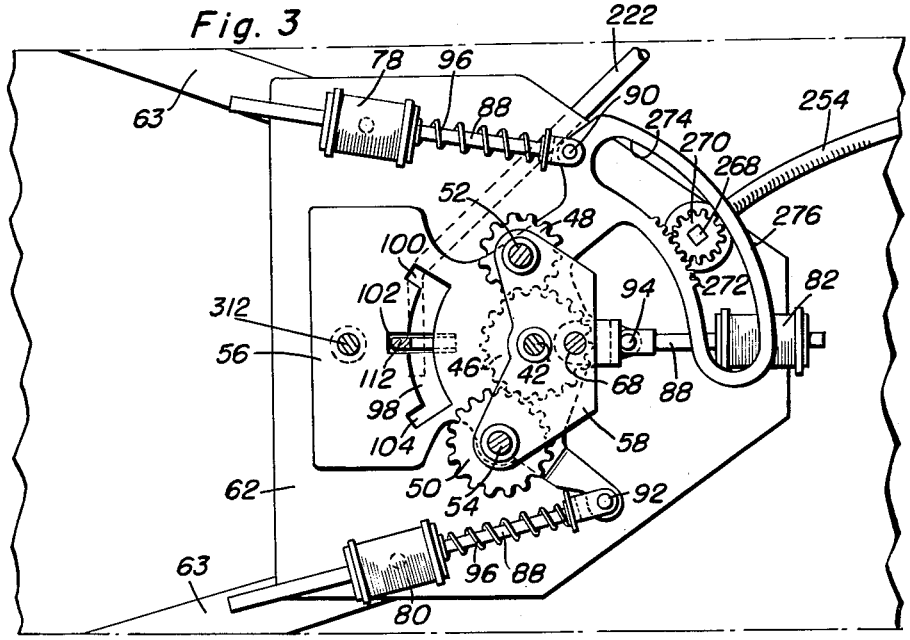
FIGURE 3 is a fragmentary horizontal sectional view taken upon an enlarged scale substantially upon the plane indicated by the section line 3—3 of FIGURE 2 and showing certain details of the turntable drive gearing assembly and the change speed assembly of the same.
Figure 4:
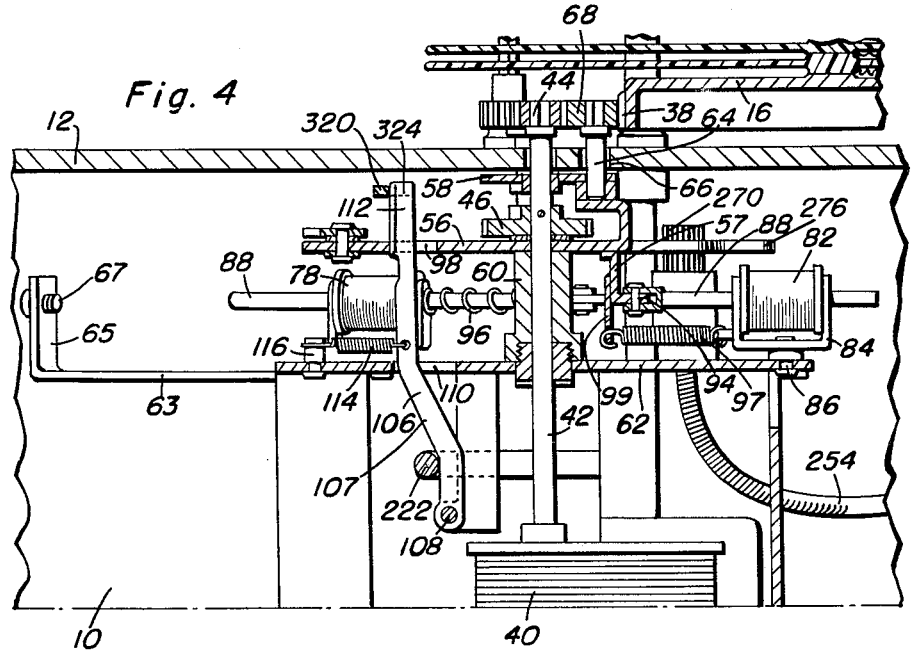
FIGURE 4 is a fragmentary vertical sectional view taken substantially upon the plane indicated by the section line 4—4 of FIGURE 1, being taken upon an enlarged scale and with parts broken away.

Referring now especially to FIGURE 4, it will be apparent that the upper end of the drive shaft is provided with a driving gear 44 disposed above the top wall 12, and an intermediate portion of the driving shaft is provided with gear 46 dsposed below the top wall. The gear 44, as set forth hereinafter, is utilized to rotate the turntable at 78 r.p.m., while the lower gear 46 is continuously in mesh with a pair of gears 48 and 50, see FIGURE 3, which respectively are utilized to impart rotational speeds of 45 and 33⅓ or other selected and predetermined r.p.m. to the turntable. The gears 44, 46 thus constitute the driving gears for the turntable for the different r.p.m. desired.

The gears 48 and 50 are carried by vertical shafts 52 and 54, respectively, these shafts being journaled upon a horizontal gear supporting and gear shifting plate 56 having an overlying plate portion 58 in which are journaled the upper ends of the shafts 52 and 54. The plate 56, including the overlying portion 58, is rotatable upon the shaft 42, being supported by a bushing 60 in which the shaft 42 is journaled, this bushing, in turn, being carried by a bracket or platform 62 suitably mounted within the cabinet 10. It will thus be seen that the plate 56 and the gears 48 and 50, carried and journaled thereby, are oscillatable about the axis of the shaft 42 for a purpose to be later set forth.

There is further mounted and journaled in the overhanging plate portion 58 a vertical shaft 64 which extends upwardly through an arcuate opening 66, see FIGURE 18, in the top wall 12 and has a gear 68 fixed thereon which is continuously in mesh with the ring gear 38 and the driving gear 44 previously mentioned.

The shafts 52 and 54 extend upwardly through arcuate slots 69 and 70, see FIGURES 1 and 18, in the top wall 12, and upon their upper ends are fixedly provided with gears 72 and 74, respectively. The gears 68, 72 and 74 constitute selective drive gears of the turntable ring gear 38, being adapted for selective engagement therewith. The positions of the gears of the assembly as so far described is such that the plate 56 may be oscillated to different positions about the axis of the drive shaft 42, to selectively cause engagement of the gear 68, which is continuously in mesh with its driving gear 44, with the turntable gear 38; or one of the gears 72 and 74, which are continuously in operative connection with their driving gear 46, of the gear assembly. The turntable may be caused to revolve at a speed of 78 r.p.m. when connected to the gears 68 and 44; or at a speed of 45 r.p.m. when the gearing drive is through the gears 46, 48, shaft 52 and gears 72 and 38; or finally at a pseed of 33⅓ r.p.m. when the drive is through the gears 46, 50, shaft 54, gears 74 and 38. Additional gear trains may be provided if additional rotational speeds of the turntable are desired. It will be observed that oscillation of the shifting plate 56 and of the gears and shafts associated therewith is permitted by virtue of the arcuate slots 66, 69, 70 in the top wall 12 of the casing.

It is, of course, apparent that the principles of this phase of the invention can be carried out to some extent by using other driving means than gears, as for example, frictional rollers and the like.

As set forth in my co-pending application Serial No. 296,382, a manual operating means indicated herein generally by the numeral 76, see FIGURES 1, 2 and 18, and referred to hereinafter more specifically, may be provided for oscillating or shifting the gear carrying plate 56. There is also provided a means for automatically effecting the shifting of the plate 56 in order to vary the speed of rotation of the turntable.

In the arrangement illustrated, electrical actuating means are provided consisting of suitable electric circuits, including switch and solenoid actuating members connected to the circuits. As shown in FIGURE 3, three solenoid members 78, 80 and 82 are provided. Each of the solenoids is carried by a U-shaped bracket 84, see FIGURE 4, which is swively mounted as by a pivoting fastener 86 to the platform 62 previously mentioned. Each solenoid armature is provided with a rod 88 which is reciprocated axially of the solenoid by the electric coil of the same, and which at its outer end is pivotally connected as by fasteners 90, 92 and 94 for the solenoids 78, 80 and 82, to portions of the shifting plate 56. A compression spring 96 surrounds each of the rods 88 of the solenoids 78 and 80 to yieldingly urge the solenoid rods 88 outwardly of their solenoids as illustrated.

The solenoid rod 88 of the solenoid 82, however, as shown in FIGURE 4, has a coil tension spring 97 which is terminally connected to the bracket 84 of the solenoid 82 and to a lug 99 extending from an arm 57 depending from the plate 56 and to which the pivot 94 of the rod of solenoid 82 is connected.

Adjustable stops are provided, as shown in FIGURES 1–4, to limit the travel of the rods of the solenoids 78 and 80 to thus prevent further movement of the adjusting plate 56 after the gears 48 or 50 are meshed with the turntable gear 38. Thus the platform 62 has extensions 63 which have their outer ends upturned at 65 to receive adjusting screws 67, the latter constituting adjustable abutments for the outer ends of the solenoid rods 88. The pair of stops 67 limit oscillation of the plate 56 in opposite directions.

As so far described, it will now be apparent from FIGURES 1, 3 that when the solenoid 78 is actuated, the gear shifting plate 56 will be oscillated in a counterclockwise direction to cause engagement of the 33⅓ r.p.m. driving gear 74 with the turntable gear; that actuation of the solenoid 80 will cause clockwise shifting of the plate 56 and engagement of the 45 r.p.m. driving gear 72 with the turntable gear; and that upon actuation of the solenoid 82, engagement of the 78 r.p.m. gears 44 and 68 with the turntable gear will be effected.

The electrical circuits and control means whereby the solenoids are selectively actuated will be described in detail hereinafter.

Speed changer latch assembly

A latch assembly, see FIGURES 3, 4 and 18 in particular, is provided for retaining the gear shifting plate 56 in selected position of adjustments depending upon the speed at which it is desired to rotate the turntable. An arcuate slot 98 is provided in the shifter plate 56, the slot, in turn, having three arcuately spaced recesses 100, 102 and 104. A latch lever 106 is pivoted at its lower end at 108 to any suitable portion of the casing 10, and extending upwardly through a slot 110 in the platform 62, and its upper end extends into the arcuate slot 98, being movable transversely of the slot, and is provided with a laterally extending latch finger 112 which is adapted to engage one of the recesses 100, 102 or 104. A spring 114 is operatively connected to the latch lever 106 and to a spring anchor post 116 mounted upon the platform 62, and yieldingly urges the latching lever in a direction to cause its finger to enter one of the recesses 100, 102 or 104, thereby latching or retaining the shifting plate 56 in selected angularly adjusted positions corresponding to the three speeds at which it is desired to drive the turntable. It will thus be seen that when the shifting plate is turned to the appropriate position to cause the gearing to drive the turntable at a selected speed, the latch finger will be spring-urged into its latching recess and thereby will retain the shifting plate in the desired position of adjustment. When the latching member 106 is withdrawn against the action of its spring 114, by a latch release means to be hereinafter set forth, the shifting plate is free to be adjusted by one of the solenoids, or by the above mentioned and hereinafter described manual adjusting means.

*Electrical control means for the variable speed drive*

The pressure arm assembly 30 previously mentioned includes the pressure arm 32 which is of hollow construction, and which at one extremity is provided with an annularly enlarged pressure arm head or pressure plate 118, see FIGURES 7–10. The latter is provided with a notch 120 whereby the head may be moved horizontally about its vertical support rod 122 and embrace the spindle 14 above a record 20 supported either by the supporting roller assembly 28 or by the turntable 16. The head 118 is hollow, having a removable cup-like casing 124 of a dielectric material inserted into the open lower end of the same. This casing houses a number of elements or units, including a series of micro-switch contacts and a series of pressure balls which are adapted to bear upon one of the records 20.

These micro-switch contacts form part of the control elements of electric circuits which through the solenoids shift the gear carrying plate 56 and thus operate the variable speed drive of the turntable. As set forth hereinafter, and described in detail and claimed in my copending application, Serial No. 324,993, filed December 9, 1952, now Patent No. 2,776,838 for Phonograph Record Disk With Speed Control Ring, a novel construction of record including control tracks or rings actuates one of the micro-switch units A, B or C to initiate operation of the electric circuits and thereby the variable speed drive.

Secured to opposite sides of each record 20, see FIGURES 8–10, and within the interlocking rings 22 thereof is an annular control track or ring 126 which is thus raised above the central portion of the record. It is contemplated that one such track will be provided for each side of a record. The control track 126 upon a record will be disposed in one of several radially spaced positions according to the speed of rotation at which the record is to be played. The pressure elements D and the micro-switch elements A, B and C of the pressure arm are disposed in three sets, each set being adapted to be actuated by a control ring or control track 126 disposed in one of the three above-mentioned spaced positions.

While three sets of pressure of micro-switch units have been illustrated, each corresponding to one of the convention record speeds of 78, 45 or 33⅓ r.p.m., it is understood that other numbers of sets of units and positions of the control ring upon a record may be used to correspond to other speeds of rotation, and to operate electrical control circuits for other purposes.

The control rings 126 may be applied to the records in various ways. They may be integrally formed in the material of the record during manufacture or may be separately formed and applied to records as by cementing and the like. Thus, conventional records may be adapted for use in this apparatus.

The bottom wall 128 of the housing 124 is provided with a plurality of openings 130 through which extend the lower portions of anti-friction pressure elements or balls 132, apertured retaining plates 134 being provided for supporting these balls upon the bottom wall and constituting wear elements or seats for the same. The balls thus have their lower portions extending through the bottom wall 128 so that when the pressure arm is lowered upon a record the balls will bear upon the control ring or control track 126 immediately thereunder, as shown in FIGURES 8–10, and thus apply the pressure of the pressure arm assembly to the record.

A bearing member 136 is provided within the pressure head 118 for each of the balls 132, each bearing member 136 comprising a block, preferably dielectric, having a bearing recess 138 adapted to slidably and movably receive the upper portion of a ball 132 and to apply pressure to a record through the track 126. The bearing members, in turn, having vertical guide bores 140 adapted to be slidably engaged upon depending vertical guide rods 142 disposed within the pressure head 118 and depending from the top surface thereof. Suitable compression springs 144 surround the guide rods 142 and urge the bearing members 136 and, through the springs 139, the balls 132 downwardly. It will thus be evident that the weight of the pressure arm assembly will be transmitted through the springs 144, bearing blocks 136, springs 139 and balls 132 to the control rings 126 and will thereby urge the record 20 downwardly against either the supporting and driving roller assembly 28 or the turntable and the records interlockingly stacked thereon.

It is contemplated that each control ring 126 will be engaged by a set of three micro-switch and pressure units. Two of the units will constitute pressure units D, being merely yieldingly mounted ball assemblies, as previously described, while the third unit, A, B or C, although similarly constructed will function both as a micro-switch and as a pressure unit as set forth hereinafter. Thus, as shown in FIGURE 7, there are three micro-switch units indicated at A, B and C, each disposed at a different radial distance from the center of the pressure head and, therefore, from the center of the axis of rotation of a record, whereby each micro-switch unit A, B or C will engage the control ring 126 with which each record will be provided at one of the three or more positions thereon. By the provision of three or more equally spaced micro-switch and pressure units for each control ring, it is evident that an even pressure will be applied to the ring and consequently to the record to firmly hold the same in engagement with the interlocking surface of an adjacent record or the toothed peripheries of the supporting and driving rollers 24.

Referring now more particularly to FIGURES 7–10, it will be seen that the micro-switch unit A, which is identical with units B and C, includes a movable electrical contact 146 of any desired construction and which is mounted in a recess in the top surface of the block 136 and to which is connected an electrical conductor 148 connected in turn to the solenoid 80. There is likewise provided a yieldable stationary contact 150 which is mounted upon and grounded to the under side of the head 118 as by suitable rivets.

This contact includes an arm 151 having a rounded terminal 153 adapted to make and break an electrical engagement with the contact 146. Arm 151 is adapted for vertical pivotal movement and for that purpose may be of flexible material integrally or otherwise connected to the contact 150; or may be flexible or rigid but hingedly connected thereto.

Means are provided, operated in response to movement of the block 136 in one direction, for first making and subsequently breaking the electrical connection of 146 and 153. One example of such means may consist of a projection 155 which may be integral with or adjustably mounted upon the block 136 and which is so positioned as to engage the arm 151 intermediate its ends or adjacent the junction of the arm 151 with the contact 150, so that after a predetermined upward travel of the block 136, during which members 146 and 153 have become engaged, further upward travel of block 136 will cause projection 155 to engage the arm 151 as shown in FIGURE 10, and thereafter lift the arm, breaking the connection as shown in FIGURE 8.

It is contemplated that sufficient time shall be permitted or caused to elapse between the positions of FIGURES 10 and 8 to allow the electric circuit, controlled by the micro-switch unit A, B or C, to complete the shifting and adjustment of the turntable drive, before said circuit is broken by movement of the micro-switch parts to the position of FIGURE 8. Any suitable time delaying mechanism, not shown, may be provided for this purpose.

The spring 139 normally yieldingly retains the ball 132 in its outermost position, as in FIGURE 9, against the apertures of the retainer plate 134. An adjusting stop consisting of the bolt 157 screw-threadedly extends through the head 118 to adjustably limit upward movement of each of the bodies 136 of the micro-switch units A, B, C or the pressure units D upon their guide rods 142, whereby the position of each of the units, as shown in FIGURE 8, may be individually adjusted.

Referring now to FIGURE 17 it will be seen that the conductors 148, 152 and 154 of the units A, B and C, are respectively connected to the solenoids 80, 82 and 78, and from the solenoids are, in turn, connected to a common source of power in the form of a transformer or the like, by a conductor 158 having a switch 159 for a purpose to be subsequently apparent. Each of the contacts 150 of the units A, B and C is grounded to the head 118.

The micro-switch units A, B and C serve the dual functions of energizing their associated solenoids to selectively adjust the turntable speed; and after a time interval during which such adjustment is completed, they break or deenergize such circuit to thereby stop the flow of current after the adjustment is completed and during the playing of a record until the next actuation of the record changing operation.

As the pressure head assembly is lowered or set down on a record, the balls 132 engaging a track 126 are first moved into the recesses 138 until stopped by the compression of the springs 139 therein. Thereafter, the members 136 are moved inwardly against the springs 144. Upon the initial inward movement of the members 136, the contacts 146 and 153 engage, closing the circuit of the associated solenoid and causing the adjustment of the turntable speed.

The first inward movement of the members 139 cause the projection 155 thereon to engage the switch blade 151 as in FIGURE 10 and then to lift the blade to thus break its contact as in FIGURE 8, thereby deenergizing the circuit. If sufficient time does not occur between the positions of FIGURES 10 and 8 to allow the solenoids to complete the speed adjustment, any suitable lost motion or time delay means may be incorporated for that purpose.

*Stack weight assembly*

As disclosed in this application, the stack weight assembly 34 conveniently comprises an arm 202, see FIGURE 16, having a ring 204 at one end with an opening 206 therein and also having upon its lower surface a depending annular rib 208. At its other end, the arm 202 has a collar 210 provided with a set screw 212 whereby the arm is removably secured to a supporting rod 214. For this purpose, the rib 208 will preferably be of greater height than that of the control rings 126.

The opening 206 of the ring 204 is adapted to permit the ring to be moved into encircling position about the spindle 14 or to be withdrawn therefrom by rotating the arm 202 about the vertical axis of the rod 214. The rib 208 is positioned to cause the same to engage the central portion of a record within the sound track and the interlocking ring of the same, whereby pressure of the assembly 34 will maintain the records of the stack 18 in firm interlocking engagement with each other and in a horizontal position upon the spindle.

The lower end of the rod 214, as shown in FIGURES 5 and 6, is removably and slidably received within the hollow upper end of the pressure arm supporting rod 122. Extending from one side of the rod 214 is a laterally projecting guide pin 216 which may be selectively positioned in a vertical slot 218 in the wall of the tubular rod 122 and extending downwardly and longitudinally of the rod 122 from the upper end of the same. By this means the rod 214 may be moved vertically of the rod 122 and when the pin 216 is in the slot 218, the arm 202 will be so positioned as to cause the ring 204 to be disposed centrally of the stack of records 18. Also disposed in the upper end of the rod 122 is a slight recess 220 which is circumferentially displaced from the slot 218 and constitutes a seat which is adapted to receive the pin 216 when the rod 214 is lifted and rotated to cause the arm 202 to be moved away from the stack of records and held thereabove. The stack weight arm 202 may thus be manipulated independently of the operation of the pressure arm lift rod 122; and the latter in its automatic, cyclic operation will not interfere with the functioning of the stack weight assembly.

It will thus be apparent that the stack weight assembly, while supported by and mounted in the pressure arm rod, is not affected by and does not affect the operation of the latter.

*Latch release mechanism*

It is desired to automatically release the latch member 106 each time the pressure arm head is set down upon a record in order to permit the speed changer to adjust the turntable speed in accordance with the control ring of the record. To perform this function a latch release mechanism is provided which is synchronized with and is operated in timed relation to the pressure arm assembly.

Thus, as shown in FIGURE 5, a bearing bracket 164 is suitably secured to the bottom wall of the cabinet 10 and is provided with a vertical journal bearing 166 which journals, guides and slidably receives the lower end of an operating rod 178. The upper portion of the operating rod is slidably received and journaled in an apertured guide block 180, mounted upon the top wall 12 of the cabinet, or within the cabinet if preferred. Upward movement of the rod 178 is limited by an adjustable collar 186 secured to the rod and engageable with the undersurface of the top wall 12 or the block 180, and a compression spring 188 and a spring adjusting collar 190 secured to the rod 178 yieldingly urge the latter into its upper position, as limited by the adjustable stop 186. Upon its upper end the rod 178 has a head portion 192 by which the rod is depressed or moved downwardly against the bias of the spring 188.

An actuating arm 196 has an adjusting screw 198 which overlies and is engageable with the head portion 192. The arm is apertured to embrace the pressure ram assembly rod 122, as also shown in FIGURE 6, being secured in vertical adjustment thereon as by a set screw 200.

It will now be evident that each time the pressure arm assembly is lifted and set down the latch operating rod 178 will also be moved, raised and then lowered against its elevating spring 188. By adjustment of the screw 198, the downward movement of rod 178 may be timed to and caused by any desired portion of the downward movement of the pressure arm assembly.

The upward movement of the operating rod 178 is employed to positively disengage or release the finger 112 of the latch lever 106 from the latch recesses 100, 102 or 104, thus permitting the adjustment of the plate 56, while the last and final portion of the downward movement of the operating rod and of the pressure arm assembly as the latter applies its holding pressure to a record, will disengage the latch lever and permit the latch spring 114 to cause engagement of the latch. To perform this function, the rod 178 is provided with a laterally extending rod 222, see FIGURE 5, having at one end a collar portion 224 which slidably embraces the rod 178 and is adjustably secured thereon as by a fastening screw 226. The rod 222 is thus guided between vertically disposed guide members 228, dependingly supported by the top wall 12 of the cabinet. Adjacent its outer end, see FIGURE 4, the rod 222 engages the latch member 106 so that upon vertical movement, the rod 222 will slide along the inclined or angulated camming surface 107 of the latch lever to thereby pivot the lever about its fulcrum 108 and disengage the latch lever from its latch recesses, as will be readily apparent.

It will thus be apparent that upward movement of the pressure arm rod 122 serves not only to lift the pressure arm assembly during its cycle of operation, but also functions to positively withdraw the latch to thereby permit the solenoids to actuate the gear shifting plate to cause the necessary adjustment of the turntable drive gear assembly for the desired speed of rotation of the turntable.

*Pressure head record guiding construction*

In addition to its functions of applying pressure to hold a record being played upon the supporting and driving assembly 28, the pressure head 118 constitutes a guide means for centering and properly positioning a record upon the supporting and driving assembly 28, thereby reducing wear between such record and the spindle 14.

As best shown in FIGURE 8, and also in FIGURES 9 and 10, the inside surface of the interlocking ring 22 of a record 20 is provided with an inclined or tapered conical surface 23. It is to be understood that any desired slope between the vertical and horizontal may be given to the surface 23, that illustrated being regarded as very satisfactory in performance. The lower edge or rim of the pressure head casing 124 may be beveled or rounded as at 25 for a sliding engagement with and into the sloping surface 23.

Thus, as the pressure head is lowered upon a record placed upon the rollers 24 of the supporting and driving assembly, the edge 25 will engage the surface 23 and thereby insure centering of the record and its interlocking ring 22 upon the rollers 24 or upon the turntable and the stack of records carried thereby. Should the record be improperly centered, the engagement of the rim 25 within the surface 23 will shift the record until the same is properly centered. This function of the pressure head will minimize wear of the record spindle aperture upon the spindle as well as effect a more perfect interlocking of the record.

*Manual operation of speed changer*

It sometimes becomes desirable to manually actuate the speed changer independently of the automatic operation thereof as for example when playing records of a conventional type. To that end, a mechanism is provided for manually shifting the gear carrier plate 56 to obtain the desired speed of rotation of the turntable and for simultaneously therewith deenergizing the electric operating circuits of the automatic speed changer.

Referring to FIGURES 1-4, 18 and particularly to FIGURE 18, it will be apparent that the manual actuating knob 76 extends through and slides in the slot 300 in the cabinet top 12. At its lower end the knob is secured to a slide 302 which is slidingly and guidingly carried by a guide bracket or support 304 mounted on the underside of the top wall 12. The slide is pivoted at 306 to an actuating link 308 which is longitudinally slotted at 310. An upstanding headed pin 312 is secured to the gear carrier plate 56 and is disposed in the slot. As will be best seen in FIGURES 2 and 18, the link 308 has an angulated portion 314 whereby the link may be connected to the vertically spaced and parallel movable members 56 and 302.

The manual adjusting means will normally be disposed in its neutral or inoperative position, as shown in FIGURE 18 when the automatic speed changer mechanism is in operation. At this time the pin 312 is freely movable between the ends of the slot 310 as the gear carrier plate 56 is shifted by the solenoids. If desired, a detent or resilient means, not shown, may be provided to retain or position the manual adjusting means in its neutral position.

When the slide 302 is shifted, however, lost motion occurs and is taken up as the pin 312 travels to one end of the slot, whereupon further travel of the slide causes the link and pin to shift the plate 56 thereby actuating the speed changer.

A lug 316 extends laterally from the slide 302 and cooperates with a switch lever 318 forming part of the switch 159 previously mentioned. When the lever 318 is positioned as shown in FIGURE 18, the switch 159 is closed and electric circuits of the speed changer are operative as set forth hereinbefore. When the lug 316 moves the lever 318 upon movement of the slide 302 in either direction from the position of FIGURE 18, the switch 159 is opened, deenergizing the electric circuits and rendering the automatic adjusting means inoperative.

As previously set forth the latch lever 106 is resiliently urged by spring 114 into engagement with the latch recesses, thereby locking the speed changer into an adjusted position. The manual adjusting means includes a manual release device for the latch lever.

As best shown in FIGURE 18, an extension 320 is provided upon slide 302, having a pair of cam surfaces 322. These surfaces are positioned to engage the upwardly extending end 324 of the latch lever 106, the latter being slightly rounded as in FIGURE 18 to facilitate such engagement. The cam surfaces 322 are so shaped and positioned that the latch will be released from its recess just prior to movement of the plate 56 by the link 308.

It will thus be apparent that manual adjustment of the plate 56 by the manual adjuster is accompanied by a rendering inoperative of the automatic adjusting mechanism and a release of the latch lever.

II

*Needle changer mechanism*

Attention is next directed more specifically to FIGURES 11-15 wherein the needle changer mechanism of the tone arm, in exemplification of the principles of this invention, is disclosed. The tone arm assembly 36 which may also be of the general construction, mounting and actuation set forth in detail and claimed in my co-pending application Serial No. 296,558, includes a hollow longitudinally horizontally extending arm 230 which is mounted upon a vertical tone arm support rod 232 for vertical movement thereon as set forth in my last-mentioned co-pending application. Rotatably journaled in the outer end of the tone arm 230 is a stylus assembly supporting shaft 234 which extends into a vertical slot 236, see FIGURES 11 and 13, extending through the tone arm. This extending portion of the shaft 234 has an annular flange or plate 238 against which is clamped a retaining plate 240 of a similar construction, being clamped thereto as by a thumb screw 242. A plurality of needles or styluses 244 are clamped between the plates 238 and 240, the styluses being disposed in pairs of diametrically opposite needles, the needles of each pair being oppositely inclined relative to the axis of the shaft 234 and adapted to engage the lower and upper sound tracks of a pair of records disposed above and below the tone arm upon the driving and supporting roller assembly 28 and the turntable respectively. One set of styluses is adapted to be used with 78 r.p.m. records, while the other set is adapted for use with micro-groove or long playing records of the 33⅓ r.p.m. type. It is thus evident that upon rotation of the shaft 234 through 90 degrees, a selected set of styluses will be positioned or changed for playing a record of the other type.

A resilient stop means is provided upon the tone arm for resiliently stopping rotation of the needle assembly, during adjustment or changing of the same for facilitating the proper positioning of the needles. This stop means, shown particularly in FIGURES 12 and 15, consists of a spring-pressed ball or plunger detent 246 mounted in the tone arm and extending into the slot 236 and which is adapted to engage selected ones of a series of detent receiving recesses 248 disposed in the adjacent face of the needle holder plate 238. The recesses and detent are so correlated with each other and with the needles that they will engage, as shown in FIGURES 12 and 15, whenever the set of needles corresponding to that recess is in proper playing position.

*Interconnection of needle changer and variable speed drive*

A connecting means is provided whereby rotation of the shaft 234 and the changing of the needles is automatically effected in synchronism with the shifting of the gear assembly plate 56 for adjusting the speed of rotation of the turntable. This connecting means comprises a flexible shaft or cable 252 disposed in a flexible housing 254, one end of this housing entering the hollow tone arm 230 through its bottom and being fixedly secured thereto as by a fastening screw 256 and clamp 257. The extremity of the cable 252 is splined and is slidably and non-rotatably engaged in the splined bore 258 of a coupling sleeve 260, which has its other end slidably connected to the extremity of the shaft 234. A finger control 262 is connected to the coupling member 260 by a fork 245 seated in an annular groove 247 therein, and extends through a longitudinal slot 264 formed in the top of the tone arm and having a transverse recess or slot 249 at its right end. Thus, by means of the finger-grip 262, the coupling may be moved towards the right and rotated into the recess or cross slot 249 to retain the coupling in the position shown in FIGURE 15, whereby driving connection between the flexible cable and the shaft 234 is broken, and the needles may be adjusted manually by rotation of the shaft 234 through the knob 242.

At its left end, the coupling sleeve has a splined clutch socket 251 with a pilot bore 253 extending therefrom. The end of the shaft 234 has a splined portion 255 which is engageable in the socket 251 and a pilot extension 257 slidably journaled in the pilot bore 253. Alternatively, the coupling sleeve may be moved to the left in the position shown in FIGURE 12, at which time a driving connection is established between the cable and the shaft 234. If desired, a compression spring 266 may be disposed in the coupling sleeve 260 between the end of the cable 252 and the bottom of the bore 258 to yieldingly urge the coupling member into coupling engagement with the shaft 234.

The other end of the flexible housing 254 extends downwardly through a suitable opening in the top wall 12 of the cabinet into the interior of the same, and is suitably fixedly secured or anchored in the cabinet. The extremity of the cable 252 is splined as shown at 268 in FIGURE 3, and is provided with a gear 270 which is adapted to engage with a gear rack 272 formed upon one side of an arcuate slot 274 in the arcuate extension 276 of the gear shifting plate 56. It will thus be seen that as the gear shifting plate is moved by the mechanism hereinbefore set forth, the rack 272 imparts rotation to the gear 270 and hence causes rotation of the flexible cable 252, to thereby simultaneously adjust the needle assembly to thereby position a set of needles appropriate to the speed of rotation at which the turntable is driven.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In an automatic record player, a turntable, means mounting said turntable for rotation about a stationary axis in a stationary plane disposed radially of said axis, a constant speed motor, said turntable having a driven gear secured thereto, said motor having a shaft with a driving gear thereon, a speed changer operatively connected to said driving and driven gears for driving the turntable at variable speeds from said constant speed motor, said speed changer including at least three intermediate gears rotating at different speeds and each having continuous operative connection with said driving gear, means for causing selective operative connection of said intermediate gears with said driven gear, a carrier plate mounted for oscillatory movement towards and from said driven gear, each of said intermediate gears being journaled upon said plate, a plurality of actuators each operatively connected to said plate, each actuator being operable to cause oscillatory movement of said plate to a position effecting engagement of one of said intermediate gears with said driven gear, automatic means for energizing said actuators and timing means operatively associated with said automatic means and restricting operation of the latter to a predetermined period in the record changing cycle of a record player.

2. In an automatic record player, a turntable having thereon a driven gear, a constant speed motor having therewith a driving gear, a speed changer operatively connected to said driving and driven gears for driving the turntable at various speeds from said constant speed motor, said speed changer including at least three intermediate gears rotating at different speeds and each having a continuous operative connection with said driving gear, means for causing selective operative connection of said intermediate gears with said driven gear, a tone arm, a needle changer assembly on the latter having needles for playing records of different speeds of rotation, interconnecting means operatively associated with said speed changer and said needle changer for positioning a predetermined needle for playing a record in accordance with the position of adjustment of the speed changer.

3. The combination of claim 2 wherein said interconnecting means includes a flexible cable, one end of said cable being secured to the tone arm.

4. The combination of claim 2 wherein said interconnecting means includes a manually operable clutch operatively engaged with said needle changer whereby the latter may be disassociated from said speed changer for manual adjustment of the needle changer.

5. The combination of claim 2 wherein said speed changer includes a carrier plate mounted for oscillatory movement and having said intermediate gears journaled thereon, a rack on said carrier plate, said interconnecting means including a gear meshing with said rack.

6. The combination of claim 5 wherein said needle changer includes a spindle upon which the needles are mounted, said interconnecting means being operatively connected to said spindle.

7. The combination of claim 6 wherein said interconnecting means includes a flexible cable with a coupling including a pair of splined bores, said bores receiving splined portions of said spindle and cable.

8. The combination of claim 7 including manual means for causing sliding movement of said connector whereby to selectively engage and disengage said interconnecting means from said spindle.

9. The combination of claim 8 wherein said cable and connector are mounted upon the underside of said tone arm.

10. In an automatic record player, a turntable, means mounting said turntable for rotation about a stationary axis in a stationary plane disposed radially of said axis, a constant speed motor, said turntable having a driven gear secured thereto, said motor having a shaft with a driving gear thereon, a speed changer operatively connected to said driving and driven gears for driving the turntable at variable speeds from said constant speed motor, said speed changer including at least three intermediate gears rotating at different speeds and each having continuous operative connection with said driving gear, means for causing selective operative connection of said intermediate gears with said driven gear, a carrier plate mounted for oscillatory movement towards and from said driven gear, each of said intermediate gears being journaled upon said plate, a plurality of electrically operable actuators each operatively connected to said plate for moving the latter to engage one of said intermediate gears with said driven gear, electric circuit means for operating said actuators, circuit control means each responsive to a record and connected to one of said actuators for effecting operation of the latter.

11. The combination of claim 10 including latch means operatively associated with said plate for retaining the speed changer in selected positions of adjustment, release means operatively associated with said latch means for releasing the latter to permit movement of said plate by said actuators.

12. The combination of claim 11 including an actuating mechanism operatively associated with said release means for actuating the latter in timed relation to operation of said actuators.

13. In an automatic record player, a turntable, means mounting said turntable for rotation about a stationary axis in a stationary plane disposed radially of said axis, a constant speed motor, said turntable having a driven gear secured thereto, said motor having a shaft with a driving gear thereon, a speed changer operatively connected to said driving and driven gears for driving the turntable at variable speeds from said constant speed motor, said speed changer including at least three intermediate gears rotating at different speeds and each having continuous operative connection with said driving gear, means for causing selective operative connection of said intermediate gears with said driven gear, a carrier plate mounted for oscillatory movement towards and from said driven gear, each of said intermediate gears being journaled upon said plate, a plurality of electrically operable actuators each operatively connected to said plate for moving the latter to engage one of said intermediate gears with said driven gear, electric circuit means for operating said actuators, circuit control means each responsive to a record and connected to one of said actuators for effecting operation of the latter, said circuit means including a timing switch preventing energization of said circuit means except during a predetermined phase of the record changing cycle of the record player.

14. In an automatic record player, a turntable, means mounting said turntable for rotation about a stationary axis in a stationary plane disposed radially of said axis, a constant speed motor, said turntable having a driven gear secured thereto, said motor having a shaft with a driving gear thereon, a speed changer operatively connected to said driving and driven gears for driving the turntable at variable speeds from said constant speed motor, said speed changer including at least three intermediate gears rotating at different speeds and each having continuous operative connection with said driving gear, means for causing selective operative connection of said intermediate gears with said driven gear, a carrier plate mounted for oscillatory movement towards and from said driven gear, each of said intermediate gears being journaled upon said plate, a plurality of electrically operable actuators each operatively connected to said plate for moving the latter to engage one of said intermediate gears with said driven gear, electric circuit means for operating said actuators, circuit control means each responsive to a record and connected to one of said actuators for effecting operation of the latter, said circuit control means including switches each operable by a different portion of a record.

15. In an automatic record player, a turntable, means mounting said turntable for rotation about a stationary axis in a stationary plane disposed radially of said axis, a constant speed motor, said turntable having a driven gear secured thereto, said motor having a shaft with a driving gear thereon, a speed changer operatively connected to said driving and driven gears for driving the turntable at variable speeds from said constant speed motor, said speed changer including at least three intermediate gears rotating at different speeds and each having continuous operative connection with said driving gear, means for causing selective operative connection of said intermediate gears with said driven gear, a carrier plate mounted for oscillatory movement towards and from said driven gear, each of said intermediate gears being journaled upon said plate, a plurality of electrically operable actuators each operatively connected to said plate for moving the latter to engage one of said intermediate gears with said driven gear, electric circuit means for operating said actuators, circuit control means each responsive to a record and connected to one of said actuators for effecting operation of the latter, manually operable means connected to said plate for actuating the same and means connected with said last means for deenergizing said circuit means.

16. In a record player for playing a stack of intermixed records having different speeds of rotation and each record having thereon a control element projecting from its surface and having a position thereon corresponding to its particular speed of rotation, a turntable, means for varying the speed of rotation of said turntable, operating means for said speed varying means operatively associated with a record for actuation by said control element thereon, said last mentioned means is disposed above and is engageable with the top side of a record, and between the spindle aperture and the sound track thereof.

17. In a record player for playing a stack of intermixed records having different speeds of rotation and each record having thereon a control element projecting from its surface and having a position thereon corresponding to its particular speed of rotation, a turntable, means for varying the speed of rotation of said turntable, operating means for said speed varying means operatively associated with a record for actuation by said control element thereon, a pressure arm engaging a record within the sound track of the same, said last mentioned means being mounted upon the pressure arm and projecting from the lower surface thereof.

18. In a phonograph record player, means for supporting and rotating records to be played, said records being of the type having switch actuating elements corresponding to different speeds of rotation of the turntable, each of said portions corresponding to the speed of rotation intended for its record, a pressure head engaging a record in its central portion within the sound track thereof, a speed changer operatively connected to said supporting and rotating means for operating the latter at various selected speeds, operating means for said speed changer including electric circuit means having an electric control switch for each speed of rotation of said supporting and rotating means, said switches being mounted upon said pressure head and engageable with and actuated by a switch actuating element when the pressure head engages the record.

19. The combination of claim 18 including pressure elements carried by said pressure head and engaging a record at a plurality of points for supporting the pressure head thereon.

20. The combination of claim 18 wherein said pressure head has a depending annular inclined surface engaging a complementary surface on a record disk for centering the pressure head relative to the record.

References Cited in the file of this patent
UNITED STATES PATENTS

| Number | Name | Date |
|---|---|---|
| 2,106,773 | Suomala | Feb. 1, 1938 |
| 2,113,401 | Goldsmith | Apr. 5, 1938 |
| 2,293,219 | Rieber | Aug. 18, 1942 |
| 2,353,370 | Sears | July 11, 1944 |
| 2,506,926 | Johnson | May 9, 1950 |
| 2,518,769 | Gay | Aug. 15, 1950 |
| 2,526,188 | Andres | Oct. 17, 1950 |
| 2,529,438 | Wennerbo | Nov. 7, 1950 |
| 2,536,432 | Faulkner | Jan. 2, 1951 |
| 2,563,649 | Hartman | Aug. 7, 1951 |
| 2,570,040 | Thorens et al. | Oct. 2, 1951 |
| 2,628,504 | Deming | Feb. 17, 1953 |
| 2,646,284 | Weingarden | July 21, 1953 |
| 2,673,089 | Osborne | Mar. 23, 1954 |
| 2,689,734 | Wennerbo et al. | Sept. 21, 1954 |
| 2,718,399 | Martin et al. | Sept. 20, 1955 |